US012358678B1

(12) United States Patent
Wang

(10) Patent No.: US 12,358,678 B1
(45) Date of Patent: Jul. 15, 2025

(54) MANUAL STICKER DISPENSER

(71) Applicant: Tianlong Wang, Guangdong (CN)

(72) Inventor: Tianlong Wang, Guangdong (CN)

( * ) Notice: Subject to any disclaimer, the term of this patent is extended or adjusted under 35 U.S.C. 154(b) by 0 days.

(21) Appl. No.: 18/641,685

(22) Filed: Apr. 22, 2024

(30) Foreign Application Priority Data

Jan. 11, 2024 (CN) ......................... 202420070955.3

(51) Int. Cl.
*B65C 11/00* (2006.01)

(52) U.S. Cl.
CPC .......... *B65C 11/00* (2013.01); *B65C 2201/00* (2013.01); *B65C 2210/0078* (2013.01)

(58) Field of Classification Search
CPC ....................................................... B65C 11/00
See application file for complete search history.

(56) References Cited

U.S. PATENT DOCUMENTS 751,516 A * 2/1904 Jenings ................. B65C 11/046 156/533
2,754,994 A * 7/1956 Cole ....................... B65C 11/00 221/73
3,036,751 A * 5/1962 Bartschi .................. B65C 11/00 225/106
5,352,320 A * 10/1994 Schwartz ............. B65H 35/002 156/577

* cited by examiner

*Primary Examiner* — Philip C Tucker
*Assistant Examiner* — John Blades

(57) ABSTRACT

A manual sticker dispenser, configured to peel a sticker from a liner paper during a sticker conveying process. The manual sticker dispenser includes: a housing; a winding shaft, capable of winding the liner paper to convey the sticker to an output port; an operating member, configured to operatively reciprocate within a set range; and a transmission mechanism, transmission-connected to the operating member and the winding shaft, and capable of transmitting power output from the operating member to the winding shaft to drive the winding shaft to rotate. The transmission mechanism includes a one-way clutching device; the one-way clutching device is configured to be coupled in condition of the operating member moving in the first direction to implement a transmission of the power, and to be uncoupled in condition of the operating member moving in the second direction opposite to the first direction to disconnect the transmission of the power.

10 Claims, 6 Drawing Sheets

MANUAL STICKER DISPENSER

CROSS REFERENCE

The present disclosure claims priority of Chinese Patent Application No. 202420070955.3 filed on Jan. 11, 2024, the entire contents of which are hereby incorporated by reference in their entirety.

TECHNICAL FIELD

The present disclosure relates to the technical field of sticker dispensing, and more specifically to a manual sticker dispenser.

BACKGROUND

Stickers are sheets that can be attached to other items. The sticker can be printed with barcodes, QR codes, or various symbols or patterns, to be used for information recording, labeling, or entertainment. Commonly, a commercially available sticker is peelably attached onto a liner paper, and a user can manually bend the liner paper such that an edge of the sticker opens up a small opening from the liner paper, whereby the sticker can be removed. This conventional method of peeling off the sticker is inconvenient, in which the liner paper may be wrinkle, and the sticker or liner paper may be torn.

Based on this, the Applicant has developed a sticker dispenser, such as published Chinese patents No. CN219970240U and CN219750321U, which realizes automatic peeling off of stickers by driving a sticker roll to rotate by means of a motor and changing conveying directions of the liner paper and the sticker at a position close to an output port. These technical solutions proposed by the Applicant overcome the above problems existing in the related art. However, the above technical solutions are adopted with a motor to drive the sticker roll to rotate, requiring the use of electrical components such as motor, circuit board, battery, etc., which is costly and requires charging or replacing the battery after a long-term use.

In view of this, the Applicant further develops and proposes a novel technical solution of a sticker dispenser.

SUMMARY OF THE DISCLOSURE

The present disclosure provides a manual sticker dispenser, such that the output of stickers may be realized by manually operations, without using electrical components, thereby reducing costs and enhancing operability and entertainment.

In order to achieve the above objectives, the technical solutions adopted in the present disclosure are as follows.

A manual sticker dispenser, for dispensing a sticker; wherein the sticker is peelably affixed to a liner paper and the manual sticker dispenser is configured to peel the sticker from the liner paper during a sticker conveying process and output the sticker from an output port; the manual sticker dispenser includes: a housing; a winding shaft, capable of winding the liner paper to convey the sticker to the output port; an operating member, configured to operatively reciprocate within a set range; and a transmission mechanism, transmission-connected to the operating member and the winding shaft, and capable of transmitting power output from the operating member to the winding shaft to drive the winding shaft to rotate; wherein the transmission mechanism includes a one-way clutching device; the one-way clutching device is configured to be coupled in condition of the operating member moving in the first direction to implement a transmission of the power, and to be uncoupled in condition of the operating member moving in the second direction opposite to the first direction to disconnect the transmission of the power.

In some embodiments, the transmission mechanism is a gear train transmission mechanism including a plurality of gears coupled to each other; the one-way clutching device includes: a movable gear, movable between a coupled position and a detached position; and a force-applying member, configured to apply a resilient force to the movable gear in a direction such that the movable gear remains in the coupled position; wherein in condition of the operating member moving in the second direction, the movable gear is capable of overcoming the resilient force to move from the coupled position to the detached position.

In some embodiments, the transmission mechanism is a gear train transmission mechanism including a plurality of gears coupled to each other; the one-way clutching device includes: a movable gear, movable between a coupled position and a detached position; and a force-applying member, configured to apply a resilient force to the movable gear in a direction such that the movable gear remains in the detached position; wherein in condition of the operating member moving in the first direction, the movable gear is capable of overcoming the resilient force to move from the detached position to the coupled position.

In some embodiments, the housing includes: a first chamber, configured to accommodate the transmission mechanism; and a second chamber, configured to accommodate the winding shaft; wherein each of at least one wall of the first chamber defines a guide slot, for guiding a movement path of the movable gear when the movable gear moves between the coupled position and the detached position.

In some embodiments, the at least one wall of the first chamber includes two walls arranged opposite to each other, and the guide slot of each of the two walls is adapted to an end of a gear shaft of the movable gear.

In some embodiments, the force-applying member is a torsion spring or a resilient sheet and includes a resilient arm that abuts against the movable gear to exert the resilient force.

In some embodiments, the transmission mechanism includes: an actuating gear, disposed upstream of and remaining coupled to the movable gear in a transmission direction of the power; and a driven gear, disposed downstream of and detachably coupled to the movable gear in the transmission direction of the power; wherein in condition of the operating member moving in the second direction, the actuating gear acts on the movable gear in a direction such that the movable gear is separated from the driven gear.

In some embodiments, the operating member includes a rack portion, and the transmission mechanism includes a first gear coupled to the rack portion, the first gear and the actuating gear being coaxially disposed; a diameter of the actuating gear is greater than double a diameter of the first gear.

In some embodiments, the driven gear is fixedly connected to the winding shaft.

In some embodiments, the operating member is connected to a reset spring, and the reset spring is configured to apply a force to the operating member in a direction such that the operating member moves in the second direction.

In some embodiments, the operating member is configured to oscillate about a defined axis.

In some embodiments, the one-way clutching device is a one-way bearing that is coupled to a transmission gear within the transmission mechanism.

The present disclosure provides a manual sticker dispenser including a winding shaft, a transmission mechanism, and an operating member; the transmission mechanism includes a one-way clutching device disconnects the power transmission; the one-way clutching device is configured to be coupled in condition of the operating member moving in the first direction to implement a transmission of the power, and to be uncoupled in condition of the operating member moving in the second direction opposite to the first direction to disconnect the transmission of the power. Therefore, the output of stickers may be realized by manually applying force on the operating member to move it in the first direction, without using electrical components, thereby reducing costs and enhancing operability and entertainment.

BRIEF DESCRIPTION OF THE DRAWINGS

To more clearly illustrate the technical solutions of the embodiments of the present disclosure, the accompanying drawings of the embodiments will be briefly described below, and it will be apparent that the accompanying drawings in the following description relate only to some embodiments of the present disclosure and are not a limitation of the present disclosure.

Figure 1:
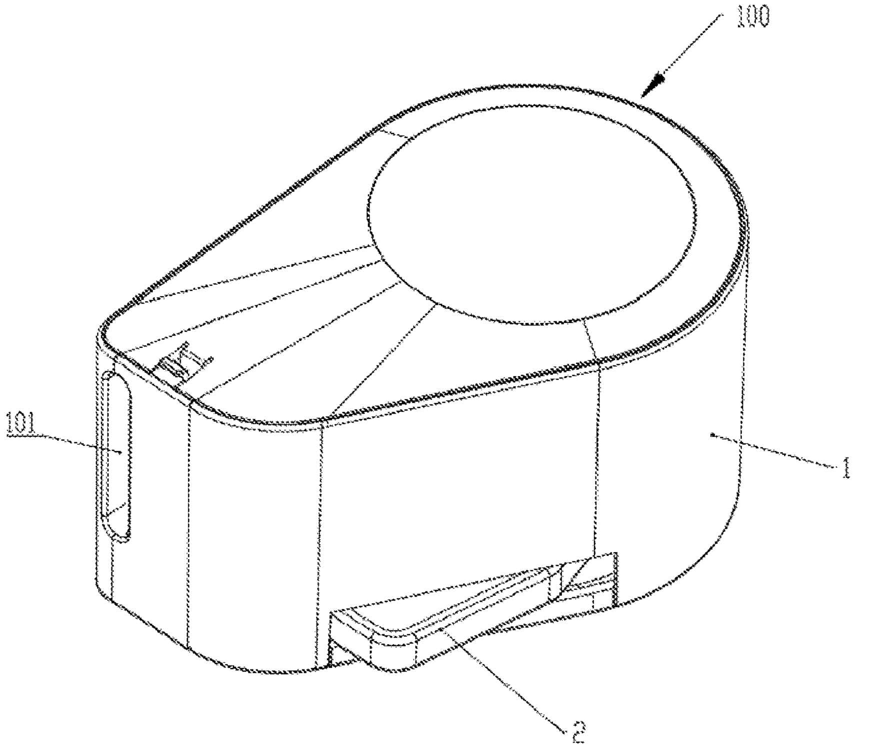
FIG. 1 is a perspective assembled view of a manual sticker dispenser according to some embodiments of the present disclosure.
Figure 2:
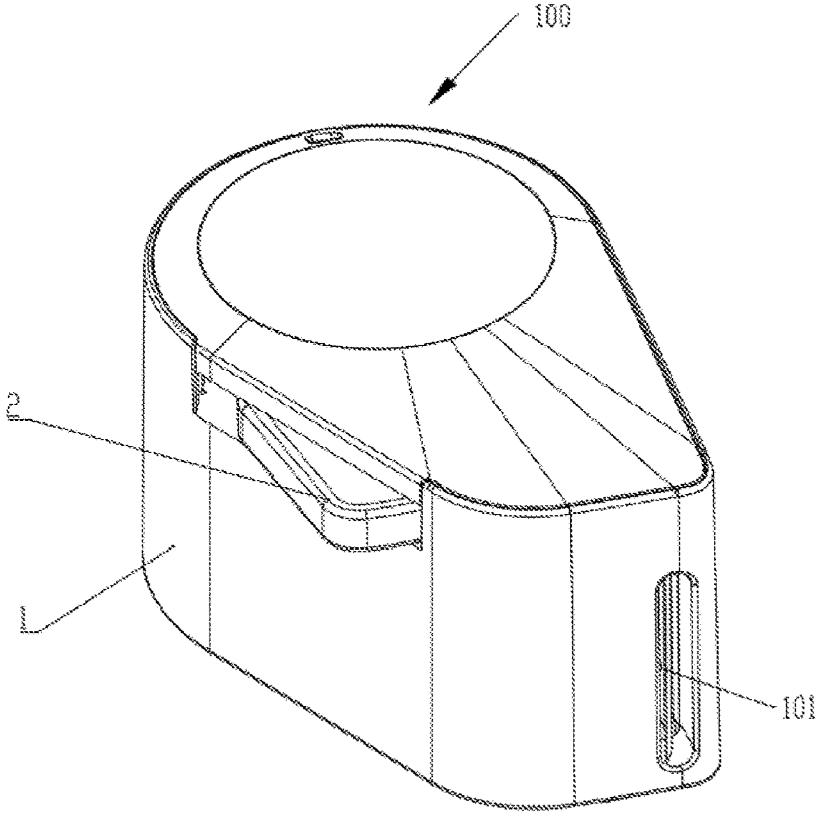
FIG. 2 is a perspective assembled view of a manual sticker dispenser according to some embodiments of the present disclosure at another viewing angle.

Reference numerals: 100—manual sticker dispenser; 1—housing; 101—output port; 11—main body shell; 110—second chamber; 111—winding shaft; 112—conveyor path; 1121—peeling structure; 113—upper elongate slot; 115—first chamber; 12—upper cover; 121—elastic buckle; 13—lower cover; 131—lower elongate slot; 2—operating member; 21—pressing portion; 22—rack portion; 23—reset spring; 3—actuating gear; 4—movable gear; 31, 41—small-diameter toothed disk; 32, 42—large-diameter toothed disk; 5—driven gear; 6—force-applying member; 8—sticker roll; 81—liner paper.

DETAILED DESCRIPTION

To make the purpose, technical solutions, and advantages of the embodiments of the present disclosure clearer, the present disclosure will be described in further detail below in conjunction with the accompanying drawings. The components in the embodiments of the present disclosure generally described and illustrated in the accompanying drawings herein may be arranged and designed in a variety of different configurations. Based on the embodiments in the present disclosure, all other embodiments obtained by those skilled in the art without creative labor are within the scope of the present disclosure.

It should be noted that similar symbols and letters denote similar items in the following accompanying drawings, and therefore, once an item is defined in an accompanying drawing, it is not required to be further defined and explained in subsequent accompanying drawings.

Unless otherwise defined, technical terms or scientific terms used in the present disclosure shall have the ordinary meaning understood by those skilled in the art. The terms "first", "second", etc. used in the specification and in the claims of the present disclosure do not indicate any order, number, or importance, but are only intended to distinguish between different components. Similarly, the terms "a", "one", or "the", etc. do not indicate a limitation of number, but rather the presence of at least one. The terms such as "include" or "contain" mean that the element or object appearing before the "include" or "contain" covers the element or object listed after the "include" or "include", and do not exclude other elements or objects. The terms of "center", "up", "down", "left", "right", "vertical", "horizontal", "inside", "outside", etc. are only intended to indicate a relative positional relationship, and when the absolute position of the described object is changed, the relative positional relationship may also be changed accordingly, which is only for the purpose of facilitating the description of the present disclosure and simplifying the description, and is not intended to indicate or imply that the device or element referred to must have a particular orientation, be constructed and operated in a particular orientation, and therefore cannot be construed as a limitation of the present disclosure.

In the description of the present disclosure, it is to be noted that, unless otherwise expressly provided and limited, the terms "mounted", "connected", and "coupled" are to be understood in a broad sense. For example, it may be a fixed connection, a removable connection, or a connection in one piece; it may be a mechanical connection or an electrical connection; it may be a direct connection or an indirect connection through an intermediate medium; and it may be a connection within the two elements. For those skilled in the art, the specific meaning of the above terms in the present disclosure can be understood in specific cases.

Some embodiments of the present disclosure are described in detail below in conjunction with the accompanying drawings. The features in the following embodiments may be combined with each other without conflict.

Referring to FIGS. 1 to 8, the present disclosure proposes a manual sticker dispenser 100 for peeling a sticker on a sticker roll 8. The sticker is peelably affixed to a liner paper 81 and wound into the sticker roll 8. The manual sticker dispenser 100 is constructed to be capable of peeling the sticker from the liner paper 81 during a sticker conveying process and outputting the sticker from an output port 101.

Figure 3:
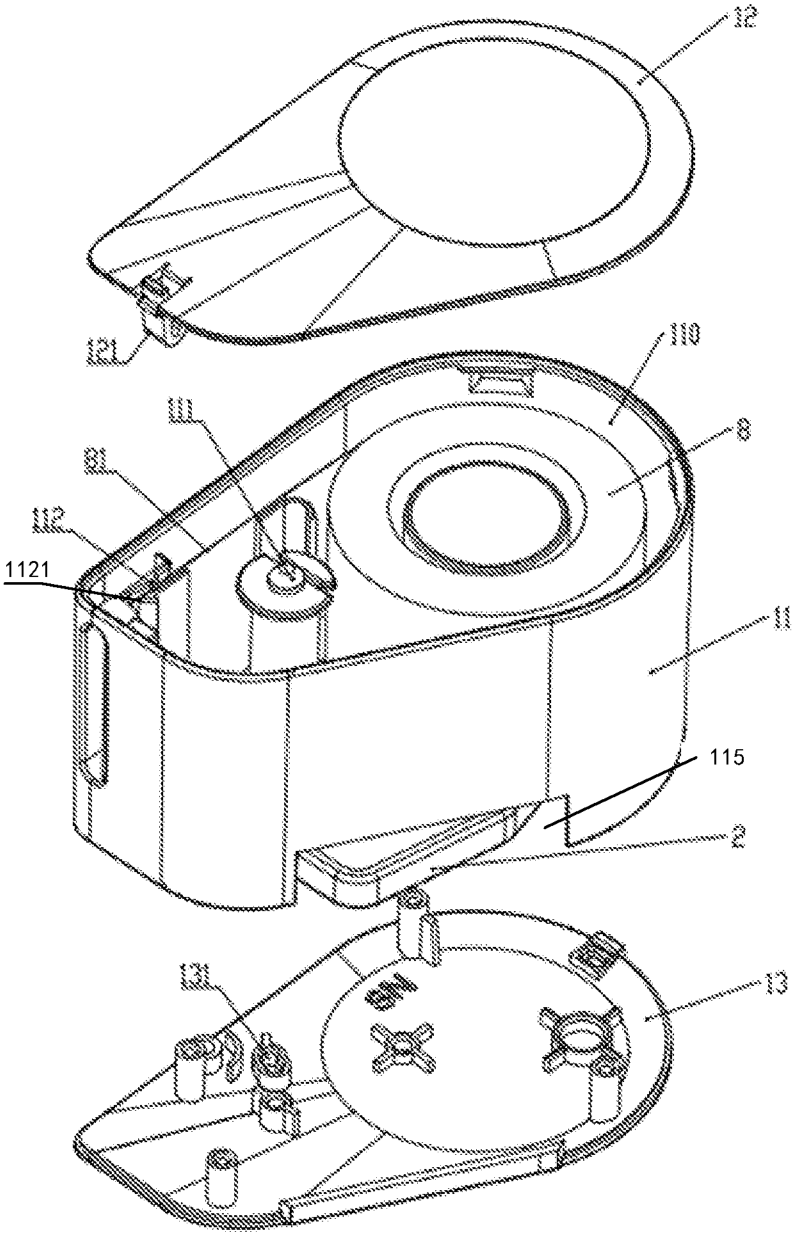
FIG. 3 is a perspective disassembled view of a manual sticker dispenser according to some embodiments of the present disclosure.

Referring to FIG. 3, the manual sticker dispenser 100 includes a housing 1, the housing 1 defining a second chamber 110 for accommodating the sticker roll 8; a conveying path 112 is defined in the second chamber 110, and the housing 1 defines the output port 101 in communication with the second chamber 110. A peeling structure 1121 is arranged on the conveying path 112, the peeling structure 1121 being disposed at the output port 101. The peeling structure 1121 is configured to peel the sticker from the liner paper 81 by conveying the liner paper 81 in a direction different from a travel direction of the sticker. Specifically, the peeling structure 1121 includes a turning peeling portion. The liner paper 81 extends in a relatively flat attitude towards the output port 101 when the liner paper 81 is disposed upstream of the turning peeling portion, and the liner paper 81 is bent backwards at the turning peeling portion to travel in a direction different from the travel direction of the sticker, causing the sticker to be peeled off of the liner paper 81. The liner paper 81 after reverse bending at the turning peeling portion is wound on a winding shaft 111. When the winding shaft 11 is driven to rotate, the winding shaft 11 pulls the liner paper 81 and the sticker affixed to the liner paper 81 to travel on the conveying path 112, and the sticker is peeled off through the peeling structure 1121.

Figure 4:
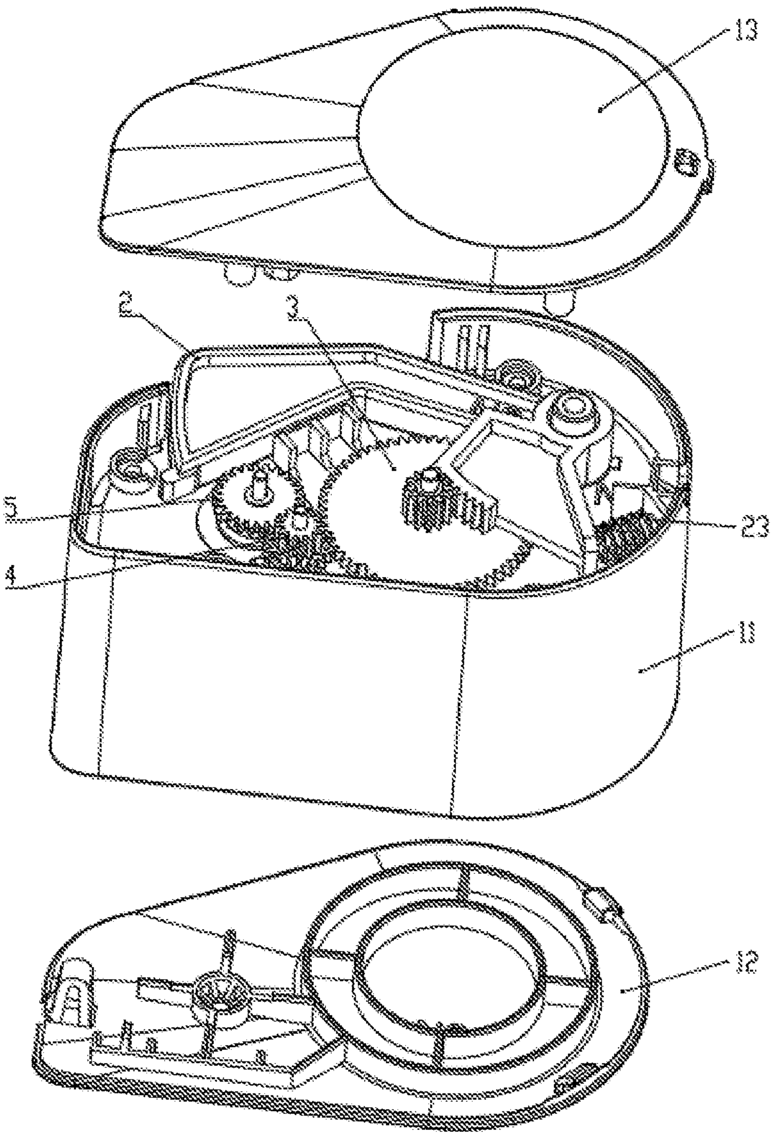
FIG. 4 is a perspective disassembled view of a manual sticker dispenser according to some embodiments of the present disclosure at another viewing angle.

Referring to FIGS. 3 and 4, the manual sticker dispenser 100 includes the winding shaft 111, a transmission mechanism, and an operating member 2. The operating member 2 is connected to the transmission mechanism, and the transmission mechanism is power-transferably connected to the winding shaft 111. The operating member 2 is configured to operatively reciprocate within a set range; specifically, the operating member 2 is configured to be driven by an operating force to move in a first direction to move from a first position to a second position, as well as to move in a second direction opposite to the first direction to reset from the second position to the first position when the operating force is released. During the movement of the operating member 2 from the first position to the second position, a continuous power transmission chain is formed between the operating member 2, the transmission mechanism, and the winding shaft 111 to drive the winding shaft 111 in a positive rotation to wind the liner paper 81. During the resetting of the operating member from the second position to the first position, the power transmission chain is disconnected at least in one place between the operating member 28, the transmission mechanism, and the winding shaft 111, in order to avoid driving the winding shaft 111 in reverse.

Referring to FIGS. 3 and 4, in the embodiments, the housing 1 includes a main body shell 11, an upper cover 12 disposed at a top of the main body shell 11, and a lower cover 13 disposed at a bottom of the main body shell 11; the main body shell 11 includes a bottom wall and a peripheral wall disposed at an edge of the bottom wall, where upper and lower edges of the peripheral wall extend beyond the bottom wall to define a second chamber 110 above the bottom wall for accommodating the sticker roll 8, and to define a first chamber 115 below the bottom wall for arranging the operating member 2 and the transmission mechanism. An end of the upper cover 12 is arranged with an elastic buckle 121 to detachably connect the upper cover 12 to the main body shell 11 for an easy replacement of the sticker roll 8. The lower cover 13 is fixed to the main body shell 11 by screw locking to prevent the transmission mechanism arranged in the first chamber 115 from falling out caused by the user easily opening the lower cover 13.

Figure 5:
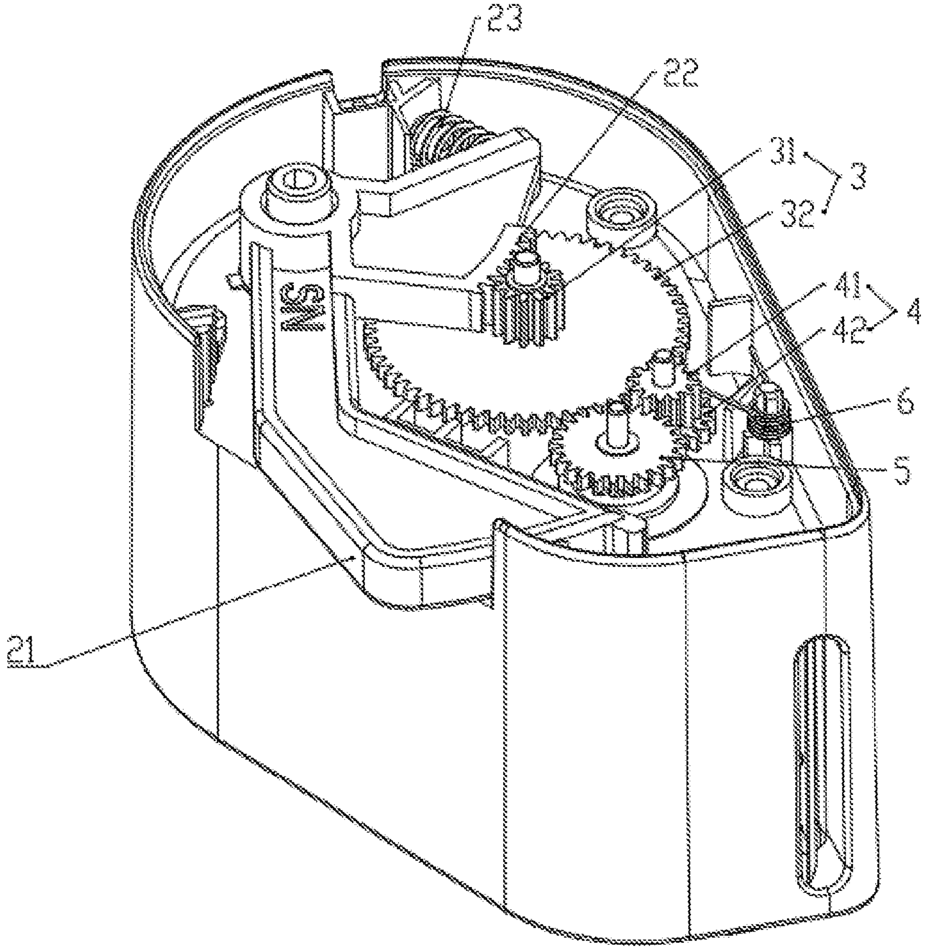
FIG. 5 is a perspective assembled view of a manual sticker dispenser showing an operating member and a transmission mechanism according to some embodiments of the present disclosure.
Figure 6:
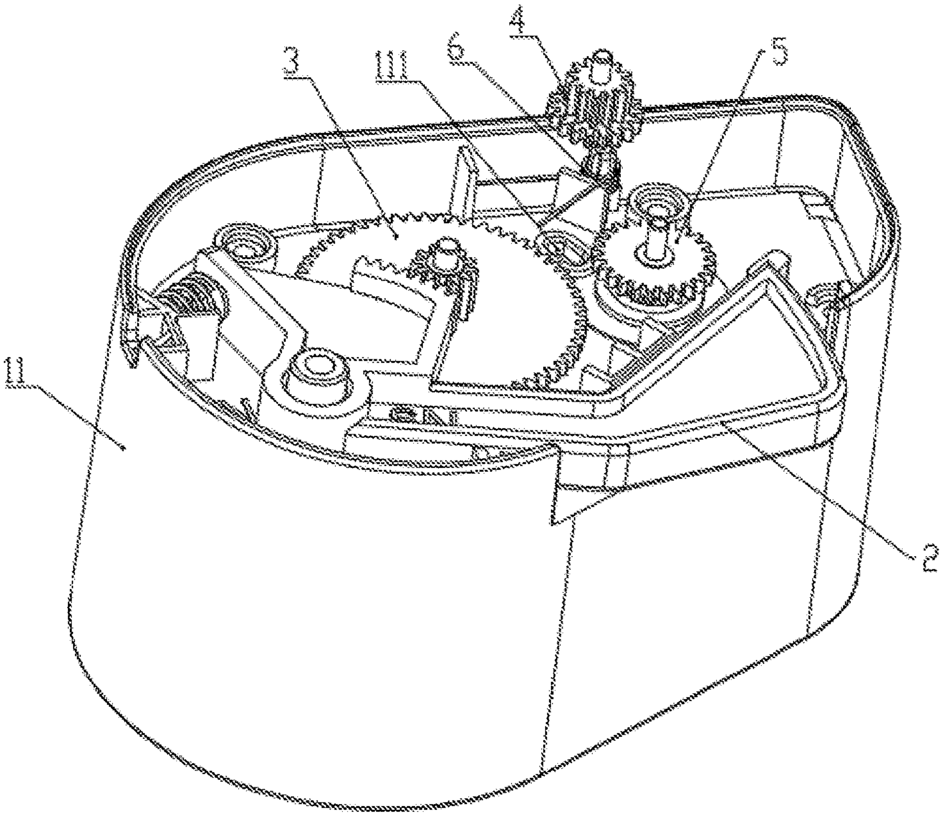
FIG. 6 is a partially disassembled view of a manual sticker dispenser showing an operating member and a transmission mechanism according to some embodiments of the present disclosure at another viewing angle.

Referring to FIGS. 4 to 6, in the embodiments, the operating member 2 is a pressable component, specifically a lever mechanism, configured to pivot around a set axis. The operating member 2 is pivotally connected to the housing 1, which includes a pressing portion 21 and a rack portion 22. The pressing portion 21 is exposed to the housing 1 and can be pressed by the user. The operating member 2 is in the first position before being pressed and is movable to the second position after being pressed. When the pressing portion 21 is pressed, the operating member 2 rotates about its pivot shaft, moving the rack portion 22. The operating member 2 is a one-piece part, e.g. plastic injection molded, and the rack portion 22 has multiple teeth integrally molded for use in conjunction with the transmission mechanism for transmitting power. In the embodiments, the rack portion 22 is curved and an axis of the curved shape is an axis of the pivot shaft of the operating member 2. The operating member 2 is resiliently pressed against the rack portion 22 by a reset spring 23, and the reset spring 23 provides a resilient force in the opposite direction to that of the pressing force. When the pressing force applied to the pressing portion is withdrawn, the reset spring 23 pushes the operating member 2 to rotate and reset to the first position prior to the application of the pressing force.

Further referring to FIGS. 4-6, the transmission mechanism is a gear train transmission mechanism including multiple gears coupled to each other, which is configured to connect the operating member 2 and the winding shaft 111 in a transmission, and to transmit the power output from the operating member 2 to the winding shaft 111 in order to drive the winding shaft 111 to rotate. The transmission mechanism includes a one-way clutching device, which is configured to be coupled when the operating member 2 is moved in the first direction to implement the power transmission, and to be uncoupled when the operating member 2 is moved in the second direction opposite to the first direction to disconnect the power transmission. In the embodiments, the transmission mechanism includes a driven gear 5 fixed relative to the winding shaft 111, an actuating gear 3 driven in engagement with the rack portion 22 of the operating member 2, and a movable gear 4 disposed between the driven gear 5 and the actuating gear 3. Specifically, the transmission mechanism includes the actuating gear 3 located upstream of and remaining coupled to the movable gear 4 in the power transmission direction, and the driven gear 5 located downstream of and detachably coupled to the movable gear 4 in the power transmission direction.

A gear shaft of the actuating gear 3 is non-translatably connected to the housing 1, and the actuating gear 3 is only capable of rotating about the axis of its gear shaft and is not movable in its axial and radial directions. In the embodiments, the actuating gear 3 is a double-layered tower gear having a small-diameter toothed disk 31 and a large-diameter toothed disk 32 that are arranged coaxial, the small-diameter toothed disk 31 of the actuating gear 3 being engaged with the rack portion 22 of the operating member 2, and the large-diameter toothed disk 32 of the actuating gear 3 being engaged with the movable gear 4. In other embodiments, the large-diameter toothed disk 32 may be understood as an actuating gear, and the small-diameter toothed disk 31 as a first gear further included in the transmission mechanism and coupled to the rack portion 2, the first gear and the actuating gear being coaxially disposed. The diameter D of the actuating gear is greater than double the diameter d of the first gear.

The movable gear 4 is configured to be movable between a coupled position and a detached position, i.e. a gear shaft of the movable gear 4 is translationally connected to the housing 1, while the movable gear 4 is also rotatable about an axis of its gear shaft. An end of the gear shaft of the movable gear 4 is connected to a bottom wall of the main body shell 11 and the other end of the gear shaft of the movable gear 4 is connected to the lower cover 13. Specifically, the bottom wall of the main body shell 11 defines an upper elongate slot 113 configured for an upper end of the gear shaft of the movable gear 4 to be inserted and slide therein; the lower cover 13 defines a lower elongate slot 131 configured for a lower end of the gear shaft of the movable gear 4 to be inserted and slide therein. The upper elongate slot 113 and the lower elongate slot 131 are opposite each other in the top-bottom direction, forming guide slots for the rotation shaft of the movable gear 4 to be inserted into and to slide within. When the rack portion 22 of the operating member 2 is engaged with the movable gear 4, the movable gear 4 can be pushed to slide along the guiding slot 131. When the movable gear 4 slides to the coupled position, it can engage with the driven gear 5. When the movable gear 4 slides to the detached position, it can disengage with the driven gear 5.

In the embodiments, the one-way clutching device includes the movable gear 4 and a force-applying member 6. The movable gear 4 is resiliently pushed against by the force-applying member 6, and the force-applying member 6 is configured to apply a resilient force to hold the movable gear 4 in the coupled position. When the operating member 2 moves in the second direction from the second position to the first position, the operating member 2 drives the movable gear 4 to overcome the resilient force and to slip to the detached position. The force-applying member 6 may be a torsion spring or a resilient sheet, with a resilient arm that abuts against the movable gear 4 to exert the resilient force. In the embodiments, the force-applying member 6 is a torsion spring having two resilient arms, one of which abuts against the movable gear 4 and the other abuts against the housing 1. In the embodiments, the spring force of the force-applying member 6 is overcome to separate the movable gear 4 from the driven gear 5. In other embodiments, the force-applying member 6 is configured to apply a resilient force for the movable gear 4 to remain in the detached position, and the operating member 2 drives the movable gear 4 to overcome the resilient force to slide to the coupled position when the operating member 2 moves in the first direction from the first position to the second position; herein when the operating force is released, the movable gear 4 is separated under the action of the spring force of the force-applying member 6. For the embodiments, the force-applying member 6 instantly drives the movable gear 4 to the detached position from the driven gear 5 when the external force on the operating member 2 is removed, such that the separation is timelier and the driven gear 5 can be better avoided from being driven to rotate in reverse. Further, there exists a small slip distance for the movable gear 4 to move from the detached position to the coupled position during the movement of the operating member 2 in the first direction, and the driven gear 5 is not driven in the slip distance, i.e. there exists a small empty travel distance of the operating member 2. In the embodiments, the reset spring 23 provides a resilient resetting force greater than the resilient force applied to the movable gear 4 by the force-applying member 6.

In the embodiments, the movable gear 4 is a double-layered tower gear having a small-diameter toothed disk 41 and a large-diameter toothed disk 42 that are arranged coaxial, the small-diameter toothed disk 41 of the movable gear 4 being engaged with the actuating gear 5, and the large-diameter toothed disk 42 of the movable gear 4 being engaged with the large-diameter toothed disk 32 of the actuating gear 3. The provision of the actuating gear 3 and movable gear 4 may serve to amplify the fact that the rotation angle of the actuating gear 3 is less than the rotation angle of the driven gear 5 during the movement of the operating member 2 from the first position to the second position.

The driven gear 5 is coaxially and relatively fixedly connected to the winding shaft 111. In the embodiments, the driven gear 5 is connected to the winding shaft 111 by a coupling structure. Specifically, a gear shaft of the driven gear 5 is arranged with a polygonal post, and a lower end of the winding shaft 111 is arranged with a polygonal sleeve, the polygonal post being inserted into the polygonal sleeve to realize a relative fixation of the polygonal post and the polygonal sleeve in a rotation direction.

Figure 7:
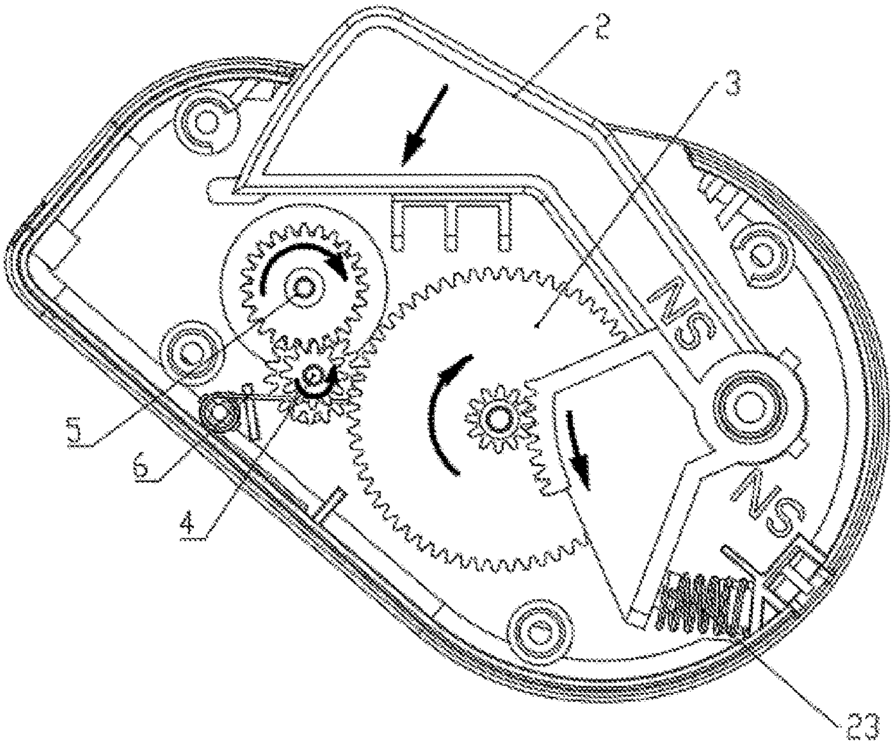
FIG. 7 is a schematic diagram of an action of a transmission mechanism when an operation member is pressed in a manual sticker dispenser according to some embodiments of the present disclosure at another viewing angle.

Focusing on FIG. 7, which is a schematic diagram of an action of the transmission mechanism during the movement of the operating member 2 in the first direction driven by an operating force: a force is applied to the pressing portion of the operating member 2 as shown by the arrow above thereof, the rack portion 22 of the operating member 2 rotates inwardly as shown by the arrow above thereof, and the actuating gear 3 rotates clockwise as shown by the arrow, in which case the movable gear 4 is pushed to translate in a direction close to the driven gear 5 and engage with the driven gear 5, and the driven gear 5 clockwise rotates as shown by the arrow, driving the winding shaft 111 to rotate in order to pull the liner paper 81 to move, thereby realizing the peeling off of the sticker and the output of the sticker.

Figure 8:
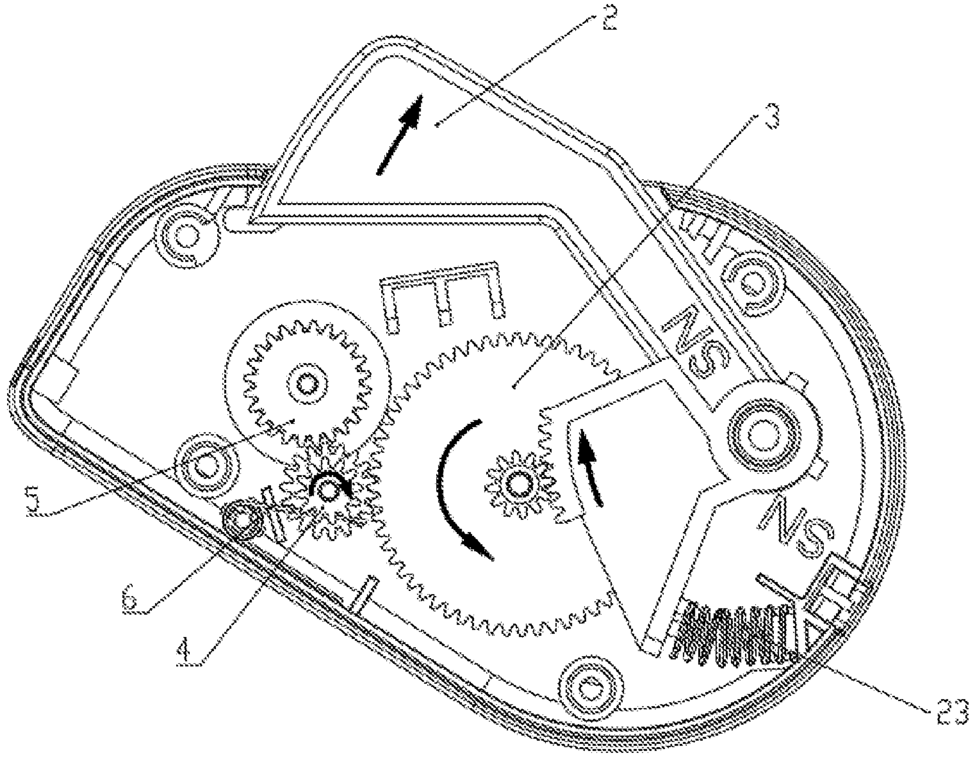
FIG. 8 is a schematic diagram of an action of a transmission mechanism when an operating member is reset in a manual sticker dispenser according to some embodiments of the present disclosure at another viewing angle.

Focusing on FIG. 8, which is a schematic diagram of an action of the transmission mechanism during a process in which the operating force applied to the operating member 2 is released and the operating member 2 is driven by the reset spring 23 to move in the second direction to reset to the first position: a force is applied to the rack portion 22 of the operating member 2 as shown by the arrow above thereof, the pressing portion of the operating member 2 moves outward as shown by the arrow above thereof, and the actuating gear 3 rotates counterclockwise as shown by the arrow, in which case the movable gear 4 is pushed to translate in a direction away from the driven gear 5 and disengage with the driven gear 5, and the rotation of the movable gear 4 driven by the actuating gear 3 is unable to be transmitted to the driven gear 5, i.e., the driven gear 5 does not rotate counterclockwise, and the winding shaft 111 does not move, thereby avoiding that the wound liner paper is loosened and the sticker cannot be output when the operating member is pressed next time, caused by the winding shaft 111 rotating counterclockwise in the course of resetting the operating member 2.

It should be noted that the present embodiments are illustrated with the movable gear 4 and the driven gear 5 being able to be disengaged as an example, and it can be understood that in other embodiments, it is sufficient to arrange such that a disengagement is feasible at any position in the transmission chain between the operating member 2 and the winding shaft 111. It should also be noted that, in the present embodiments, the switching between engagement and disengagement is achieved by translation of the movable gear 4, which in other embodiments can be achieved by means of a ratchet structure. For example, in some embodiments, the one-way clutching device is a one-way bearing, i.e. an overrunning clutch, which is coupled to a transmission gear within the transmission mechanism; the one-way bearing is free to rotate in one direction independently of the winding shaft 111, while in the other direction opposite, the one-way bearing is locked to the winding shaft 111 and both rotate in synchronization.

As can be seen from the above description of specific embodiments, the present disclosure provides a manual sticker dispenser 100 including a winding shaft 111, a transmission mechanism, and an operating member 2; the operating member 2 is configured to be driven by an operating force to move in a first direction, and is configured to move in a second direction opposite to the first direction when the operating force is released; during a movement of the operating member 2, a continuous power transmission chain is formed between the operating member 2, the transmission mechanism, and the winding shaft 111, to drive the winding shaft 111 to rotate and wind the liner paper; during a movement of the operating member 2 in the second direction, the one-way clutching device disconnects the power transmission, which avoids driving the winding shaft 111 in reverse. Therefore, the output of stickers may be realized by manually applying force on the operating member 2, without using electrical components, thereby reducing costs and enhancing operability and entertainment.

Although the above description has been made herein with reference to specific embodiments, the scope of the present disclosure is not limited thereto. The preceding detailed description is intended to be considered illustrative and not limiting, and it should be understood that the appended claims, including all equivalents, are intended to limit the scope of the present disclosure. The claims should not be construed to be limited to the order or elements described, except as indicated. Accordingly, all embodiments falling within the scope and spirit of the appended claims and their equivalents are claimed to be protected by the present disclosure.

What is claimed is:

1. A manual sticker dispenser, for dispensing a sticker; wherein the sticker is peelably affixed to a liner paper and the manual sticker dispenser is configured to peel the sticker from the liner paper during a sticker conveying process and output the sticker from an output port; the manual sticker dispenser comprises:

a housing;

a winding shaft, capable of winding the liner paper to convey the sticker to the output port;

an operating member, configured to operatively reciprocate between a first position and a second position; and a transmission mechanism, transmission-connected to the operating member and the winding shaft, the transmission mechanism capable of transmitting power output from the operating member to the winding shaft to drive the winding shaft to rotate;

wherein the transmission mechanism comprises a one-way clutching device coupled in condition of the operating member moving in a first direction to implement a transmission of the power, and to be uncoupled in condition of the operating member moving in a second direction opposite to the first direction to disconnect the transmission of the power;

wherein the transmission mechanism is a gear train transmission mechanism comprising a plurality of gears coupled to each other;

wherein the one-way clutching device comprises:

a movable gear, movable between a coupled position and a detached position; and a force-applying member applying a resilient force to the movable gear towards the coupled position;

wherein in condition of the operating member moving in the first direction to move from the first position to the second position, the movable gear moves from the detached position to the coupled position, driven by the resilient force of the force-applying member;

wherein in condition of the operating member moving in the second direction to reset from the second position to the first position, the movable gear moves from the coupled position to the detached position due to the movement of the operating member in the second direction overcoming the resilient force.

2. The manual sticker dispenser according to claim 1, wherein the housing comprises:

a first chamber, configured to accommodate the transmission mechanism; and a second chamber, configured to accommodate the winding shaft; wherein each of at least one wall of the first chamber defines a guide slot, for guiding a movement path of the movable gear when the movable gear moves between the coupled position and the detached position.

3. The manual sticker dispenser according to claim 2, wherein the at least one wall of the first chamber comprises two walls arranged opposite to each other, and the guide slot of each of the two walls is adapted to an end of a gear shaft of the movable gear.

4. The manual sticker dispenser according to claim 1, wherein the force-applying member is a torsion spring or a resilient sheet and comprises a resilient arm that abuts against the movable gear to exert the resilient force.

5. The manual sticker dispenser according to claim 1, wherein the transmission mechanism comprises:

an actuating gear, disposed upstream of and remaining coupled to the movable gear in a transmission direction of the power; and a driven gear, disposed downstream of and detachably coupled to the movable gear in the transmission direction of the power;

wherein in condition of the operating member moving m the second direction, the actuating gear acts on the movable gear in a direction such that the movable gear is separated from the driven gear.

6. The manual sticker dispenser according to claim 5, wherein;

the operating member comprises a rack portion;

the transmission mechanism comprises a first gear coupled to the rack portion;

the first gear and the actuating gear are coaxially disposed; and a diameter of the actuating gear is greater than double a diameter of the first gear.

7. The manual sticker dispenser according to claim 5, wherein the driven gear is fixedly connected to the winding shaft.

8. The manual sticker dispenser according to claim 1, wherein the operating member is connected to a reset spring, and the reset spring is configured to apply a force to the operating member in a direction such that the operating member moves in the second direction.

9. The manual sticker dispenser according to claim 1, wherein the operating member is configured to oscillate about a defined axis.

10. The manual sticker dispenser according to claim 9, wherein the one-way clutching device is a one-way bearing that is coupled to a transmission gear within the transmission mechanism.

* * * * *